United States Patent Office 2,946,762
Patented July 26, 1960

---

2,946,762
AQUEOUS SOLUTION CONTAINING A BISULFITE AND ACRYLONITRILE POLYMER HAVING BASIC AMINO GROUPS

Witold R. Kocay, Stamford, Conn., assignor to American Cyanamid Company, New York, N.Y., a corporation of Maine No Drawing. Filed Nov. 1, 1956, Ser. No. 619,686

14 Claims. (Cl. 260—29.6)

This invention relates broadly to the stabilization of polymer solutions, and more particularly to the color stabilization of solutions containing a polymer of acrylonitrile. Still more particularly the invention is concerned with compositions comprising an aqueous solution of an acrylonitrile polymer that contains basic (e.g., tertiary amino) groups, and from 0.1% to 5%, by weight of the said polymer on a net-dry basis, of a water-soluble inorganic bisulfite, e.g., an alkali-metal bisulfite.

Discoloration of solutions of a polymer of acrylonitrile that contains basic groups, by which is meant more particularly acrylonitrile copolymers (thermoplastic acrylonitrile copolymers) that contain basic groups, has long been a problem in the art of producing filamentary materials and other shaped articles, e.g., films and sheets, from such solutions. This is true with solutions made by dissolving the acrylonitrile polymer in various solvents, including solvents comprising a concentrated aqueous solution of a water-soluble salt that yields highly hydrated ions in aqueous solution. Because of this lack of color stability of such polymer solutions and the resulting tendency of the color bodies that form to be carried through into the product formed from such solutions, it has been necessary to utilize them, for instance in spinning filamentary material therefrom, in a relatively short period of time, e.g., within about a day or so. The disadvantages of such relatively short storage life will be immediately apparent to those skilled in the art. Furthermore, the lighter the color of the finished articles (e.g., continuous filaments and staple fibers, and woven and knitted goods made therefrom), the better is the competitive position of the manufacturer of such an article both from a volume and price standpoint.

The present invention is based on my discovery that solutions of a polymer of acrylonitrile of the kind described briefly in the preceding paragraphs and more fully hereinafter can be stabilized against discoloration by incorporating therein a small but effective amount of a water-soluble inorganic bisulfite, more particularly an amount corresponding to from 0.1% to 5% by weight of the acrylonitrile polymer on a net-dry basis. The water-soluble inorganic bisulfite may be introduced into the solution as such, or in the form of the meta-bisulfite or as the hydrate. The percentage proportions mentioned above are on the basis of bisulfite as such. Illustrative examples of water-soluble inorganic bisulfites that can be used are the alkali-metal bisulfites, viz., sodium, potassium, lithium, caesium and rubidium; ammonium bisulfite; etc. The corresponding meta-bisulfites (anhydrous form of the bisulfite) or the hydrated forms of the bisulfites just mentioned can be used, as well as compounds which engender a bisulfite, e.g., a glyoxal-sodium bisulfite addition compound, a formaldehyde-sodium bisulfite addition compound, an acetone (or other ketone)-sodium bisulfite addition compound, etc.

The acrylonitrile copolymer that contains basic groups can be dissolved in any suitable aqueous solvent, but I prefer to use a solvent comprising a concentrated aqueous solution of a water-soluble salt that yields highly hydrated ions in aqueous solution, e.g., the chlorides, bromides, iodides, thiocyanates, perchlorates and nitrates. (The use of concentrated aqueous solutions of such salts as solvents for polyacrylonitrile and other polyvinyl compounds is more fully described in Rein U.S. Patent No. 2,140,921 dated December 20, 1938.) More specific examples of such water-soluble inorganic salts are zinc chloride, calcium chloride, lithium bromide, cadmium bromide, cadmium iodide, sodium thiocyanate, potassium thiocyanate, calcium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. Preferably, a water-soluble salt is employed that imparts a minimum of color to the solution. The concentration of the aforesaid water-soluble salt in the water in all cases is sufficiently high so that the resulting solution will dissolve the acrylonitrile polymer. In most cases the concentration of such water-soluble salt is substantially above 40% (e.g., from 45%–50% to 55%–60%) of the total weight of the solution of said salt dissolved in water, the upper limit being a saturated solution of the salt in water.

Instead of dissolving the water-soluble salt in water alone it can be dissolved in a mixture of water and an alcohol, e.g., a saturated aliphatic monohydric alcohol and especially such monohydric alcohols that contain from 1 to 6 carbon atoms, inclusive. In such mixtures the ratio of the weight of water to the weight of the aliphatic liquid in the solvent mixture preferably lies in the range of from 2:1 to 1:4. More specific examples of suitable liquids containing an alcoholic hydroxyl group are methyl alcohol, ethyl alcohol, ethylene glycol monoethyl ether, ethylene glycol monomethyl ether, diacetone alcohol and ethyl lactate. Such mixtures additionally may contain acetonitrile or acetone, or both, and/or other organic compounds, e.g., ethyl lactate. For additional information on solvent mixtures comprising water and an organic compound see, for instance, British Patents 714,530 and 718,997.

The concentration of the acrylonitrile polymer in the aqueous solvent depends, for example, upon the particular solvent and extrusion apparatus employed in making a filamentary material or other shaped article from the solution, the diameter of the fiber or other article to be extruded and the average molecular weight of the polymer. The concentration may range, for example, from about 5% to about 20% by weight of the composition, that is, by weight of the total amount of polymer, solvent for the polymer, and water-soluble inorganic bisulfite. In most cases the concentration of the polymer in the solvent will be within the range of from about 6% or 7% up to about 15% or 16% by weight of the solution. The viscosity of the solution, as determined by measuring the time in seconds for a Monel metal ball ⅛" in diameter to fall through 20 cm. of the solution at 61° C., may be, for instance, from 10 to 200 seconds.

The preferred acrylonitrile polymer that is used in producing the compositions of the present invention is a fiber-formable acrylonitrile copolymer that contains basic groups. Such acrylonitrile polymers have an average molecular weight which renders them suitable for use in producing filamentary materials therefrom, for instance within the range of from about 30,000 to about 200,000, more particularly from about 40,000 to about 100,000, and still more particularly from about 60,000 to about 80,000. (The average molecular weight may be determined, for example, from a viscosity value of a dimethylformamide solution of the acrylonitrile polymer and calculations by means of the Staudinger equation: U.S. Patent No. 2,404,713.) Acrylonitrile polymers which yield a solution having a specific viscosity at 40° C. within the range of 2 to 10 when 1 gram of the polymer is dissolved in 100 ml. of 60% aqueous sodium thiocyanate have an average molecular weight which enables the polymer to be used as a fiber-formable material. Hence such polymers can be used in forming the compositions, specifically spinning solutions, of the present invention.

In the acrylonitrile copolymers containing basic groups that are used in practicing the present invention, it is preferred that the copolymer have a preponderant proportion (more than 50%) by weight of acrylonitrile combined in the polymer molecule, and, more particularly, at least 70% by weight of combined acrylonitrile in the copolymer molecule. In most cases the acrylonitrile copolymer that contains basic groups will have at least 80% by weight of acrylonitrile combined in the polymer molecule. Among such copolymers may be mentioned those that contain, combined in the polymer molecule, at least 70% (preferably at least 80%) by weight of acrylonitrile and up to 30% (preferably up to 20%) by weight of at least one different monoethylenically unsaturated monomer which is copolymerizable with acrylonitrile and which includes a vinyl-substituted heterocyclic tertiary amine (sometimes designated as a vinyl-substituted tertiary heterocyclic amine), e.g., a vinylpyridine. Instead of, or in addition to, using a vinyl-substituted heterocyclic tertiary amine as the co-monomer with acrylonitrile, one can use other monomers containing basic groups that are copolymerizable with acrylonitrile, e.g., a monoethylenically unsaturated aliphatic tertiary amine (sometimes designated as a monoethylenically unsaturated tertiary aliphatic amine), or a plurality of such amines.

Examples of vinylpyridines that can be used in producing the aforementioned copolymers are those represented by the general formula I 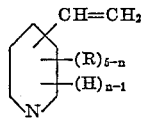

wherein R represents a lower alkyl radical, more particularly a methyl, ethyl, propyl (including n-propyl and isopropyl) or butyl (including n-butyl, isobutyl, sec.-butyl and tert.-butyl) radical, and $n$ represents an integer from 1 to 5, inclusive. Examples of vinylpyridines embraced by the above formula are 2-vinylpyridine, 3-vinylpyridine, 4-vinylpyridine, 2-methyl-3-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine, 3-methyl-4-vinylpyridine, 2-vinyl-4,6-dimethylpyridine and 2-vinyl-4,6-diethylpyridine.

Other examples of vinyl-substituted heterocyclic tertiary amines that can be used in preparing the acrylonitrile copolymers are the various isomeric vinylpyrazines, vinylquinolines (including the 2- and 4-vinylquinolines), vinyloxazoles, vinylimidazoles and vinylbenzoxazoles.

Illustrative examples of monoethylenically unsaturated aliphatic tertiary amines that can be employed in making acrylonitrile copolymers for use in practicing the present invention are those represented by the general formula II 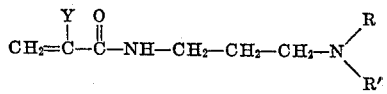

where R and R' each represents an alkyl radical (which may be the same or different), and Y represents hydrogen or an alkyl radical. Illustrative examples of alkyl radicals represented by the above R and R' (and also by Y when this substituent is an alkyl radical) are meth-yl, ethyl, propyl, isopropyl, n-butyl, isobutyl, sec.-butyl, tert.-butyl, the various amyls (e.g., n-amyl, isoamyl, etc.), the various hexyls, etc. Preferably Y represents hydrogen or a methyl radical. One example of a compound embraced by Formula II is dimethylaminopropylacrylamide having the formula III 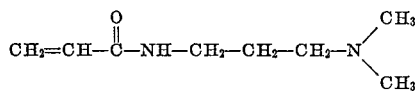

This compound may be named N-(3-dimethylaminopropyl)-acrylamide. Another example of a compound embraced by Formula II is dimethylaminopropylmethacrylamide having the formula IV 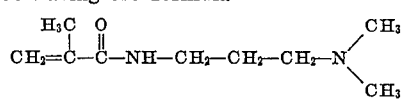

This compound may be named N-(3-dimethylaminopropyl)-methacrylamide.

Other illustrative examples of monoethylenically unsaturated aliphatic tertiary amines that can be employed in producing acrylonitrile copolymers for use in practicing this invention are those represented by the general formula V 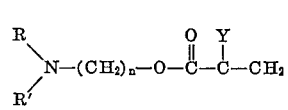

where R, R' and Y have the same meanings as given above with reference to Formula II, and $n$ represents a whole number between 2 and 4, inclusive. Preferably Y represents hydrogen or a methyl radical, and $n$ represents 2.

Illustrative examples of compounds embraced by Formula V are the dimethylaminoethyl acrylates and methacrylates; the diethylaminoethyl acrylates and methacrylates; the dipropylaminoethyl acrylates and methacrylates; the di-isopropylaminoethyl acrylates and methacrylates; the corresponding N-substituted aminopropyl, aminoisopropyl and aminobutyl acrylates and methacrylates; the N-methyl-N-ethylaminoethyl, -aminopropyl-, -aminoisopropyl and -aminobutyl acrylates and methacrylates; and the corresponding N-methyl-N-propyl-, N-methyl-N-isopropyl-, N-ethyl-N-propyl-, N-ethyl-N-isopropyl-, and N-propyl-N-isopropylaminoalkyl acrylates and methacrylates.

Other examples of unsaturated monomers containing basic groups that can be used in making the acrylonitrile copolymer are quaternary ammonium derivatives of the ethylenically unsaturated amines mentioned above by way of example. Such quaternary ammonium compounds include, for example, quaternary pyridinium compounds represented by the general formula VI 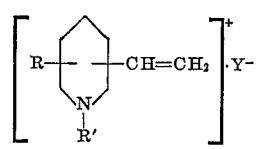

wherein R represents a member of the class consisting of hydrogen and alkyl radicals, R' represents a radical of the class consisting of alkyl, hydroxyalkyl and aralkyl radicals, and Y— represents an anion.

A preferred sub-group of acrylonitrile copolymers that are used in making the compositions of this invention are those containing, in addition to acrylonitrile and the monomer having basic groups, at least one additional, different, monoethylenically unsaturated monomer that contains a $CH_2=C<$ grouping and is copolymerizable with acrylonitrile and the basic monomer (e.g., a vinylpyridine). In such copolymers the acrylonitrile predominates (as mentioned hereinbefore) and the monomer containing basic groups and the aforesaid additional different monomer, which constitute the remainder, are present in a weight ratio of 1:10 to 10:1. A particularly useful class within this preferred sub-group are acrylonitrile copolymers that contain, combined in the polymer molecule, at least 80% by weight of acrylonitrile, from 2% to 10% by weight of a vinylpyridine, and from 2% to 10% by weight of at least one additional, different, monoethylenically unsaturated monomer of the kind described more fully above.

Illustrative examples of non-basic monomers (that is, the different monoethylenically unsaturated monomers to which reference has been made hereinbefore) that can be copolymerized with acrylonitrile and a basic monomer (that is, a monomer containing basic groups) to form acrylonitrile copolymers for use in producing the compositions of the present invention are monoethylenically unsaturated compounds represented by the general formula VII 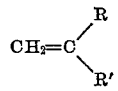

where R represents a member of the class consisting of hydrogen, halogen, and alkyl, cycloalkyl, aryl, alkaryl and aralkyl radicals, and R' represents a radical of the class consisting of aryl and alkaryl radicals and radicals represented by the formulas VIII 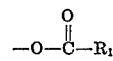

IX 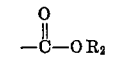

X 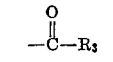

XI 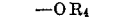

where $R_1$ and $R_2$ each represents a radical selected from the class consisting of alkyl, cycloalkyl, and alkoxy radicals, $R_3$ represents a radical selected from the class consisting of alkyl, cycloalkyl, alkoxyalkyl and aryl radicals, and $R_4$ has the same meaning as $R_1$ and $R_2$. Examples of compounds embraced by Formula VII are the vinyl esters (e.g., vinyl acetate, vinyl propionate, vinyl butyrate, etc.), methyl vinyl ketone, ethyl vinyl ketone, methyl vinyl ether, ethyl vinyl ether, various esters of acrylic acid (e.g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art from Formula VII, other examples which follow and the definitions of R, R', $R_1$, $R_2$, $R_3$ and $R_4$ hereinbefore given.

Still other examples of different monoethylenically unsaturated substances that can be copolymerized (singly or a plurality of them) with the acrylonitrile and basic monomer to make a ternary (or higher multi-component) copolymer that contains basic groups are other vinyl compounds, including the vinyl aromatic compounds, more particularly the vinyl aromatic hydrocarbons (e.g., styrene, the various dialkyl styrenes, etc.), other aliphatic compounds containing a $CH_2=C<$ grouping, e.g., the various substituted acrylonitriles (e.g., methacrylonitrile, ethacrylonitrile, phenylacrylonitrile, etc.), the various acrylamides (e.g., acrylamide itself, methacrylamide, ethacrylamide, the N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc., vinyl esters, e.g., vinyl chloroacetate, vinyl isobutyrate, vinyl valerate, etc., vinyl and allyl ethers, e.g., monoallyl ether of glycerol, esters of an acrylic acid, more particularly the alkyl esters of acrylic acid, e.g., the propyl, isopropyl, n-butyl, sec.-butyl, tert.-butyl, amyl, hexyl, heptyl, octyl, decyl, dodecyl etc., esters of acrylic acid, including the alkyl acrylates containing not more than four carbon atoms in the alkyl grouping, examples of which have been given above.

Instead of using a single acrylonitrile copolymer that contains basic groups, I may use a plurality of such copolymers; or a blend of one or more such copolymers with one or more homopolymers or copolymers that contain neither acrylonitrile nor a monomer or monomers that contain a basic group, e.g., homopolymeric methacrylonitrile, homopolymeric methyl acrylate, a copolymer of methacrylonitrile and methyl acrylate, etc. In such blends the proportions of the different acrylonitrile polymers may be varied as desired or as conditions may require, but in general it is preferable that the blend have an overall acrylonitrile polymer content of more than 50% by weight of the blend and advantageously at least 70% by weight of the blend. Good results are obtained in producing compositions containing a mixture of different acrylonitrile polymers when the overall acrylonitrile polymer content of the composition is at least 80% by weight thereof. The terms "acrylonitrile copolymer," as used herein and/or in the appended claims, are intended to include within their meaning, unless otherwise specifically stated or a different meaning is clear from the context, both a single polymer that contains basic groups and blends of different polymers, at least one of which contains basic groups; and wherein a substantial proportion, generally a major proportion (e.g., at least 70%), by weight of acrylonitrile in polymeric state, is present therein.

Any suitable method can be used in producing the compositions of the present invention. The solution of the polymer in the aqueous solvent may first be formed and the water-soluble inorganic bisulfite then added thereto; or the bisulfite may be added to the aqueous solution or dispersion prior to the addition of the acrylonitrile polymer that contains basic groups; or the bisulfite may be incorporated into the composition simultaneously with the dissolution of the acrylonitrile polymer in the aqueous solvent. In the preferred compositions of the invention the solution is adjusted to a pH within the range of from 4.0 to 8.0, and preferably to a pH within the range of from about 4.5 to less than 7.0, e.g., 4.5–6.5, if it is not within the aforesaid broad range (or more specific ranges, as may be desired) upon completion of the formulation.

The method of dissolving the acrylonitrile polymer in the solvent comprising a water-soluble salt which yields highly hydrated ions in an aqueous solution may be that which is disclosed and claimed in Cresswell U.S. Patent No. 2,605,246, dated July 29, 1952. When this method is followed the same variations described above, as to the stage at which the water-soluble inorganic bisulfite is added, can be made.

Heretofore it has been common practice to store spinning solutions comprising an acrylonitrile polymer that contains basic groups and which is dissolved in a concentrated aqueous solution of, for instance, sodium thiocyanate under an atmosphere of nitrogen and to use it within a few hours after preparation; otherwise it rapidly discolors, and this discoloration is carried through the spinning operation to give a fiber of poor color. By incorporating a water-soluble inorganic bisulfite into the solution, in accordance with this invention, it has been found that the solution can be stored in the presence of air for days, or often for weeks and sometimes months, without visible (or objectionable) discoloration. This is a matter of considerable practical importance in commercial plant operations, since it permits storage of a spinning solution comprising an acrylonitrile polymer that contains basic groups for a prolonged period before use and without the danger of producing off-color fiber due to discoloration of the spinning solution during storage.

Even more important than the advantages described above is the fact that the invention provides filamentary materials comprised of an acrylonitrile polymer that contains basic groups (and therefore of improved dye receptivity, especially toward acid dyes), which filamentary materials are substantially whiter in color both originally and after heating for a prolonged period at an elevated temperature than are filaments made in exactly the same manner but in which no water-soluble inorganic bisulfite has been incorporated in the spinning solution. A further improvement in fiber color (both initially and after being subjected to heat) is obtained when the spinning solution is extruded through a spinnerette into an aqueous coagulating bath having an acidic pH (that is, below 7.0), advantageously a pH between about 4.0 and 6.8.

In order that those skilled in the art better may understand how the present invention may be carried into effect, the following examples are given by way of illustration and not by way of limitation. All parts and percentages are by weight.

*Example 1*

A spinning solution (A) is prepared by first mixing 24 parts of a 57.3% aqueous solution of calcium thiocyanate with 2.5 parts of water and adjusting the pH of the resulting solution to 6.5. Two parts of (1) finely divided copolymer that contains, combined in the polymer molecule, about 98% acrylonitrile and about 2% dimethylaminoethyl methacrylate, and (2) 0.06 part of sodium bisulfite are thoroughly mixed into the aqueous calcium thiocyanate solution while maintaining the temperature of the latter at $-8°$ C. Mixing is continued for 36 hours while keeping the solution at a temperature of 40°–45° C. During this period additional water or copolymer are added, as may be required in order that the viscosity of the solution, as determined by measuring the time for a Monel metal ball, 1/8" in diameter and weighing 0.142 gram, to fall through 20 cm. of the solution maintained at 61° C., will be about 85 seconds.

Another spinning solution (B) is prepared in exactly the same manner described above with the exception that the sodium bisulfite is not added. Samples of both solutions are placed in containers (from which air is not excluded) and allowed to stand at room temperature (20° to 30° C.), with periodic visual examination. Solution A containing the color stabilizer (sodium bisulfite) shows no visual evidence of discoloration after standing for 6 weeks, while solution B is visibly discolored after standing for between 2 and 3 days.

*Example 2*

A spinning solution (A) is produced by dissolving 14 parts of (1) a powdered copolymer that contains, combined in the polymer molecule, about 88% acrylonitrile, about 6% methyl acrylate and about 6% 2-methyl-5-vinylpyridine, and (2) 0.07 part of potassium bisulfite in 186 parts of a 48% aqueous solution of calcium thiocyanate, the mixture being stirred until a homogeneous solution is obtained. The solution is adjusted to a pH of 6.8.

Another spinning solution (B) is prepared in exactly the same manner described above with the exception that the potassium bisulfite is not added. Samples of both solutions are placed in containers (from which air is not excluded) and allowed to stand at room temperature, being visually examined from time to time. Solution A containing the potassium bisulfite stabilizer shows no visual evidence of discoloration after standing for 22 days, while solution B is visibly discolored after standing for about 30 hours.

*Example 3*

Same as in Example 2 with the exception that, instead of the copolymer of that example, there is used 14 parts of a copolymer that contains, combined in the polymer molecule, about 95% acrylonitrile and about 5% 2-methyl-5-vinylpyridine, and having an average molecular weight of about 80,000 as calculated by means of the Staudinger equation from the viscosity of a solution of the polyacrylonitrile in dimethylformamide; and, instead of 0.07 part of potassium bisulfite, there is used 0.042 part of sodium meta-bisulfite.

A sample of the solution (A) is tested for its color stability in comparison with a sample of another solution (B), the latter being a "control" solution that is prepared in exactly the same manner as solution A with the exception that the 0.042 part of sodium meta-bisulfite has been omitted. Solution A shows no visual evidence of discoloration after standing for 5 weeks while solution B is appreciably discolored in from 2 to 3 days.

*Example 4*

Twenty-seven and eight-tenth (27.8) parts of an acrylonitrile copolymer that contains basic groups is dissolved, with stirring, in 200 parts of a 75% aqueous solution of zinc chloride for 90 minutes at 85°–90° C. (The copolymer contains, combined in the polymer molecule, about 97% acrylonitrile and about 3% of dimethylaminopropylacrylamide.) To the solution of the copolymer is added dropwise with stirring, over a period of 90 minutes, 50 parts of water containing 1 part of sodium bisulfite, the solution temperature being gradually reduced to 75° C. This solution (A) is adjusted to a pH of 7.0, and is later used in casting films as subsequently will be described.

Another solution (B) is prepared in exactly the same manner with the exception that the sodium bisulfite is omitted. Both solutions are allowed to stand undisturbed and are periodically examined as in the preceding examples. Solution A shows no appreciable evidence of discoloration after standing for more than 1 week, while the color of solution B, after less than 24 hours, is poorer than its original color, and continues to get worse upon longer standing.

Films are cast from both solutions at the end of a week. The solutions are cast on glass plates, as a 0.004" thick layer, by using a doctor blade. The polymer (approximately 10% by weight of the solution) is then precipitated as a film on the individual plates by immersion of the plates in water (maintained at $+0.5°$ C.) to which sufficient hydrochloric acid has been added to make it 0.25 N. (This dilute acid prevents the precipitation of basic zinc chloride when the solution is used as a coagulating bath.)

The plates containing the precipitated films are removed from the cold-water bath, air-dried first at room temperature and then in a 110° F. oven to constant weight. The dried film that was cast from solution A (containing the color stabilizer) is materially lighter in color, upon visual examination, than that cast from solution B.

*Example 5*

In forming the spinning solution (A) of this example, 194 parts of a granulated, wet, copolymer cake consisting of about 28% water and about 72% of an acrylonitrile copolymer that contains, combined in the polymer molecule, about 85% acrylonitrile, about 5% vinyl acetate, about 5% methyl acrylate and about 5% 2-methyl-5-vinylpyridine, is dispersed with rapid stirring into 640 parts of a 43.5% aqueous solution of calcium thiocyanate at about 23° C. (The average molecular weight of the copolymer as determined from viscosity measurements of a dimethylformamide solution, using the Staudinger equation as described, for example, in U.S. Patent No. 2,404,714, is 74,000.) A homogeneous slurry results. While continuing to stir rapidly, 1170 parts of a 55.9% aqueous solution of calcium thiocyanate is added to the slurry described above concurrently with the addition of 1.6 parts of calcium bisulfite. The viscosity soon increases, and the stirring is reduced to a low speed. After stirring for 3 hours at a low speed and at a temperature of about 20° C., solution of the copolymer appears to be complete. The solution is adjusted to a pH of 5.5.

Another spinning solution (B) is prepared in exactly the same manner described above with the exception that the calcium bisulfite is not added. Samples of both solutions are stored and examined from time to time as described in the preceding examples. Solution A containing the calcium bisulfite shows no visual evidence of discoloration after standing for 27 days while solution B is appreciably discolored when examined after standing for only 2 days.

*Example 6*

One hundred and ninety-four (194) parts of an acrylonitrile copolymer that contains, combined in the polymer molecule, about 80% acrylonitrile and about 20% 2-vinylpyridine is dispersed with rapid stirring in 1196 parts of a 50% aqueous solution of guanidine thiocyanate at about 25° C. A homogeneous slurry results. While continuing to stir rapidly, 610 parts of guanidine thiocyanate and 0.7 part of sodium metabisulfite are added to the slurry, and the mixture is heated to 40° C. A thin, clear solution results when the mixture reaches this temperature. After adjusting to a pH of 5.8 and further stirring at 40° C., the viscosity of this spinning solution (A) increases to the consistency of molasses.

Another spinning solution (B) is prepared in exactly the same manner described above with the exception that the sodium meta-bisulfite is omitted. Samples of both solutions are stored and examined from time to time as described in the preceding examples. Solution A containing the stabilizer (introduced initially in the form of sodium meta-bisulfite) shows no visual evidence of discoloration after standing for 13 days while solution B is noticeably darker than its original color after standing for only about 36 hours.

*Example 7*

Same as in Example 1 with the exception that, instead of 0.06 part of sodium bisulfite, there is used 0.1 part of an addition compound of formaldehyde and sodium bisulfite in a 1 to 1 molar ratio. Similar results with respect to color stability on standing at room temperature are obtained.

*Example 8*

An acrylonitrile copolymer containing, combined in the copolymer molecule about 96% acrylonitrile, about 2% vinyl acetate and about 2% 2-methyl-5-vinylpyridine, and 0.1% of sodium meta-bisulfite, based on the weight of the copolymer, are dissolved in 48% aqueous calcium thiocyanate solution to form a spinning solution (A) containing about 8% of the said copolymer.

Another spinning solution (B) is prepared in exactly the same manner described above with the exception that the sodium meta-bisulfite is omitted. Both solutions are stored and periodically examined in the same manner described in preceding examples. Solution A containing the color stabilizer is not noticeably discolored after standing for over a week while solution B is darker than its original color after standing for only about 30 hours.

Increasing the amount of stabilizer up to 5%, by weight of the net-dry copolymer, increases the resistance of the spinning solution of this example (as well as others hereinbefore given) against discoloration on standing. Amounts above 5% of stabilizer can be used if desired, but no particular advantages appear to accrue therefrom.

*Example 9*

In producing the spinning solution (A) of this example an aqueous solution of sodium thiocyanate, more particularly 7.57 kg. of a 57.7% aqueous solution of sodium thiocyanate, and enough water (3.35 kg.) to make a 40% solution, which is a concentration insufficient to dissolve the acrylonitrile polymerization product, are charged into a mixing kettle equipped with high-speed agitation. The solution is agitated and a vacuum of 29 inches of mercury is applied for 7 minutes, after which the agitation is stopped. Fifteen (15) minutes later the vacuum is released and 6.45 kg. of a moist crumb (66% solids) of an acrylonitrile copolymer that contains, combined in the polymer molecule, about 94% acrylonitrile, about 3% vinyl acetate and about 3% 2-methyl-5-vinylpyridine is added without agitation. Vacuum is reapplied and after 8 minutes the high-speed agitation is started. After 5 minutes, 27.63 kg. of a 57.7% aqueous solution of sodium thiocyanate and 42.7 grams of sodium bisulfite are added over a period of at least 3 minutes while the batch is being agitated under vacuum. The speed of agitation is reduced in 12 minutes, and agitation is then continued until all of the copolymer has dissolved, which usually takes place in about 1 hour or a little less.

Another spinning solution (B) is prepared in exactly the same manner described above with the exception that the sodium bisulfite is omitted. Both solutions are stored and periodically examined in the same manner described in preceding examples. Solution A containing the sodium bisulfite is not noticeably discolored after standing for more than 5 weeks, while solution B is visibly discolored after standing for less than 3 days.

Individual portions of solutions A and B are adjusted to a pH of 5.2 with acetic acid (glacial), filtered and deaerated under vacuum. The deaerated spinning solution, in each case, is heated to about 70° C. prior to extrusion through a 45-hole spinnerette having openings 75 microns in diameter into a coagulating bath comprising a 10% aqueous solution of sodium thiocyanate and maintained at about 0° C. After water-washing and stretching operations, the multifilament yarn is continuously dried on converging drying rolls, and is then thermally retracted 15% by passage through a heat-treating furnace in a relaxed, free-to-shrink state. The production speed is 90 meters per minute. The dried multifilament thread made from solution A is lighter in color than that made from solution B.

Fibers similarly wet spun from the solutions of the other examples, using either cold water alone as the coagulating bath or a coagulating bath comprising about 10% of the same salt used in making the spinning solution, show either a marked improvement in color or have as good a color, when made from aged solutions A (containing the stabilizer) as those made from freshly prepared solutions B (containing no stabilizer). A further improvement in color is generally obtained when the coagulating bath also is adjusted to an acidic pH prior to extruding the spinning solution through the openings of the spinnerette into the bath. Thus, the bath advantageously may be adjusted to a pH within the range of, for example, 4.0 to 6.5 with acetic, sulfuric, nitric or other acid prior to spinning.

*Example 10*

Spinning solutions containing, in the individual solution, sodium bisulfite in an amount corresponding to 0.5%, 1%, 2% and 5%, by weight of the net-dry copolymer, as well as a "control" solution containing no sodium bisulfite, are individually prepared as follows:

One hundred (100) grams of a copolymer of about 88% acrylonitrile, about 5.7% vinyl acetate and about 6.3% 2-methyl-5-vinylpyridine is dissolved at room temperature, with stirring, in 900 grams of a 50% aqueous solution of sodium thiocyanate. The above percentages of sodium bisulfite are added to the aqueous thiocyanate solution prior to dissolving the copolymer therein. A control solution is similarly prepared.

A sample of the control solution (no bisulfite added) has an original A.P.H.A. color of about 80, while the solutions containing the bisulfites have A.P.H.A. colors ranging from about 25 to about 40. After standing for about 7 months at room temperature (air is not excluded) the control solution has an A.P.H.A. color of about 2200, while the others (containing bisulfite) have A.P.H.A. colors ranging from about 300 to about 500.

Continuous-filament yarns are spun from the individual solutions, prepared as described above, after each solution has stood undisturbed in contact with air for about 3 days. The method is the same as that described under Example 9; however, the solutions are not adjusted to a particular pH as specified in Example 9 (adjustment to a pH of 5.2 with glacial acetic acid prior to spinning). The dried yarns are examined for color as follows:

Samples of the continuous-filament yarns are wound on a special frame such that a layer of fibers approximately 2" x 2" in area is formed with a thickness sufficient to be opaque. The spectral reflectance is measured on a General Electric, Hardy-type spectrophotometer with $MgCO_3$ used as a standard white. The various calculations, involved in getting values for yellowness and brightness, are made using the data from the spectral reflectance curve according to standardized procedures. Calculations are based on observations made under daylight. The results are given in the following table.

| Solution | Fiber Color | | | |
|---|---|---|---|---|
| | Original (Before Heating) | | After Heating for ½ hr. at 240° F. | |
| | Yellowness | Brightness | Yellowness | Brightness |
| "Control" solution (no NaHSO₃ added) | 0.154 | 74.0 | 0.173 | 71.4 |
| Solution containing 0.5% NaHSO₃ | 0.114 | 76.6 | 0.125 | 74.5 |
| Solution containing 1.0% NaHSO₃ | 0.106 | 72.8 | 0.133 | 71.9 |
| Solution containing 2.0% NaHSO₃ | 0.102 | 78.3 | 0.120 | 76.6 |
| Solution containing 5.0% NaHSO₃ | 0.117 | 78.0 | | |

NOTE.—All percentages of $NaHSO_3$ are based on the weight of the net-dry acrylonitrile copolymer.

I claim:

1. A fiber-formable, fluid composition comprising an aqueous solution having dissolved therein an acrylonitrile polymer that has, combined in the polymer molecule, a preponderant proportion by weight of acrylonitrile and a minor proportion by weight of at least one different monoethylenically unsaturated monomer which is copolymerizable with acrylonitrile and which includes a monoethylenically unsaturated monomer having basic amino groups, said polymer constituting from about 5% to about 20% by weight of the said composition; and, to improve the color stability on aging of the said aqueous solution, from 0.1% to 5%, by weight of the said polymer on a net-dry basis, of a water-soluble inorganic bisulfite.

2. A fiber-formable, fluid composition as in claim 1 wherein the polymer of acrylonitrile contains, combined in the polymer molecule, at least 80% by weight of acrylonitrile and up to 20% by weight of at least one different monoethylenically unsaturated monomer which is copolymerizable with acrylonitrile and which includes a vinyl-substituted heterocyclic tertiary amine.

3. A fiber-formable, fluid composition as in claim 2 wherein the vinyl-substituted heterocyclic tertiary amine is a vinylpyridine.

4. A fiber-formable, fluid composition as in claim 1 wherein the aqueous solution in which the acrylonitrile polymer is dissolved is a solvent comprising a concentrated aqueous solution of a water-soluble salt that yields highly hydrated ions in aqueous solution, said salt being selected from the class consisting of zinc chloride, calcium chloride, lithium bromide, cadmium bromide, cadmium iodide, sodium thiocyanate, potassium thiocyanate, calcium thiocyanate, zinc thiocyanate, aluminum perchlorate, calcium perchlorate, calcium nitrate and zinc nitrate.

5. A fiber-formable, fluid composition as in claim 4 wherein the polymer of acrylonitrile constitutes from about 6% to about 16% by weight of the composition.

6. A fiber-formable, fluid composition comprising an acrylonitrile polymer that contains, combined in the polymer molecule, at least 80% by weight of acrylonitrile and up to 20% by weight of at least one different monoethylenically unsaturated monomer which is copolymerizable with acrylonitrile and which includes a vinylpyridine, said polymer being dissolved in a concentrated aqueous solution of a water-soluble thiocyanate, and from 0.1% to 5%, by weight of the said polymer on a net-dry basis, of an alkali-metal bisulfite, said polymer constituting from about 5% to about 20% by weight of the said composition.

7. A fiber-formable, fluid composition as in claim 6 wherein the water-soluble thiocyanate is sodium thiocyanate.

8. A fiber-formable, fluid composition as in claim 6 wherein the alkali-metal bisulfite is sodium bisulfite.

9. A fiber-formable, fluid composition as in claim 6 wherein the water-soluble thiocyanate is sodium thiocyanate and the alkali-metal bisulfite is sodium bisulfite.

10. A fiber-formable, fluid composition as in claim 6 which is within the pH range of from 4.0 to 8.0.

11. A fiber-formable, fluid composition as in claim 6 wherein the vinylpyridine is 2-methyl-5-vinylpyridine.

12. A fiber-formable, fluid composition comprising an aqueous solution including (1) an acrylonitrile copolymer that contains, combined in the polymer molecule, at least 80% by weight of acrylonitrile, from 2% to 10% by weight of a vinylpyridine, and from 2% to 10% by weight of at least one additional, different, monoethylenically unsaturated monomer that contains a $CH_2=C<$ grouping and is copolymerizable with the acrylonitrile and vinylpyridine, said copolymer being dissolved in a concentrated aqueous solution of sodium thiocyanate, and (2) from 0.1% to 5%, by weight of the said polymer on a net-dry basis, of sodium bisulfite, said copolymer constituting from about 6% to about 16% by weight of the said solution, and said composition having a pH within the range of from about 4.5 to less than 7.0.

13. A fiber-formable, fluid composition as in claim 12 wherein the additional, different monoethylenically unsaturated monomer is methyl acrylate.

14. A fiber-formable, fluid composition as in claim 12 wherein the additional, different monoethylenically unsaturated monomer is vinyl acetate.

References Cited in the file of this patent

UNITED STATES PATENTS

| | | |
|---|---|---|
| 1,912,345 | Del Plaine | May 30, 1933 |
| 2,404,728 | Finzel | July 23, 1946 |
| 2,432,448 | Richards | Dec. 9, 1947 |
| 2,502,030 | Scheiderbauer | Mar. 28, 1950 |
| 2,587,465 | Ham et al. | Feb. 26, 1952 |
| 2,644,803 | Cresswell | July 7, 1953 |
| 2,648,648 | Stanton et al. | Aug. 11, 1953 |
| 2,661,305 | Appleton et al. | Dec. 1, 1953 |
| 2,710,846 | Dietrich et al. | June 14, 1955 |
| 2,751,374 | Cresswell | June 19, 1956 |
| 2,774,648 | Mecco et al. | Dec. 18, 1956 |
| 2,837,492 | Stanton et al. | June 3, 1958 |

OTHER REFERENCES

Partington: "A Text-Book of Inorganic Chemistry," page 467, (6th Edition), MacMillan and Company, London (1953).